No. 783,842. PATENTED FEB. 28, 1905.
W. KRAMER.
FISHING REEL.
APPLICATION FILED SEPT. 29, 1904.
2 SHEETS—SHEET 1.
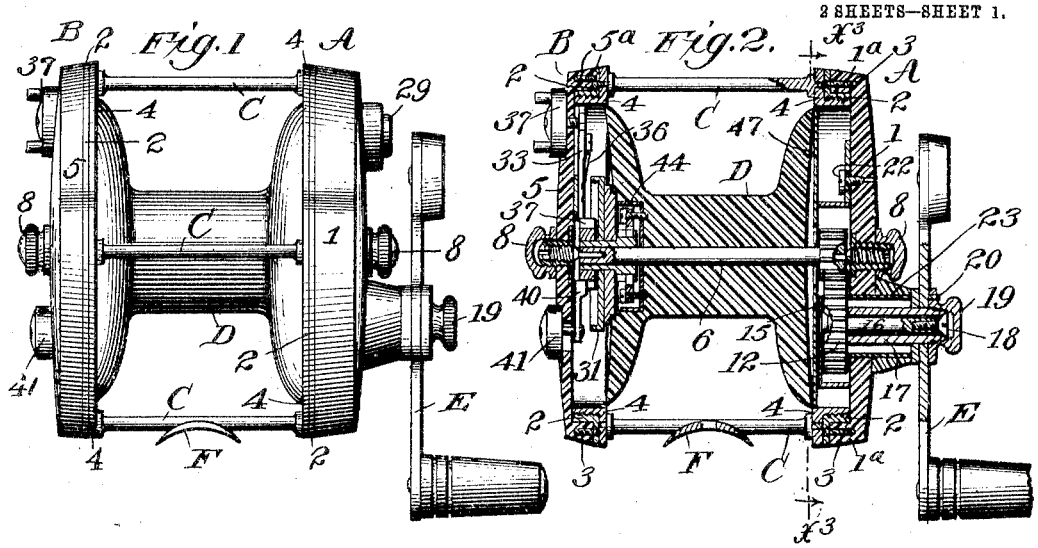
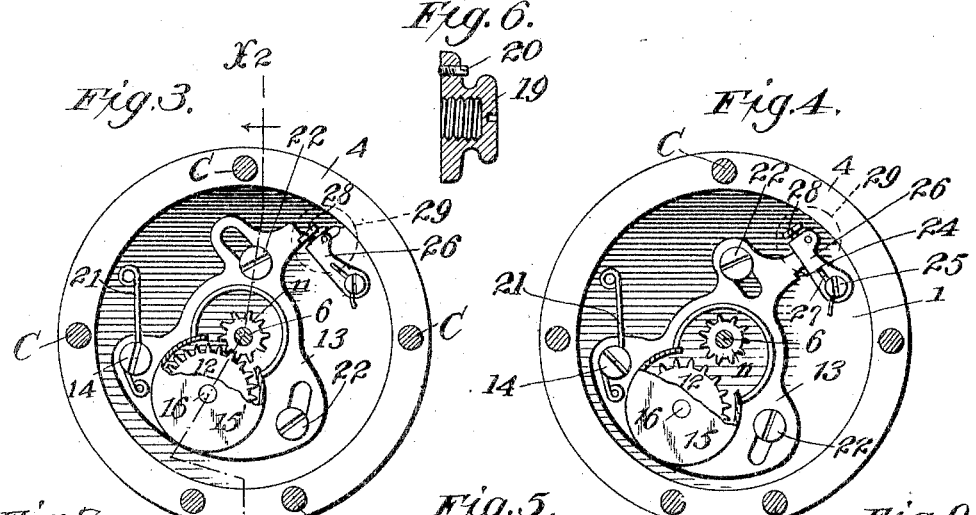
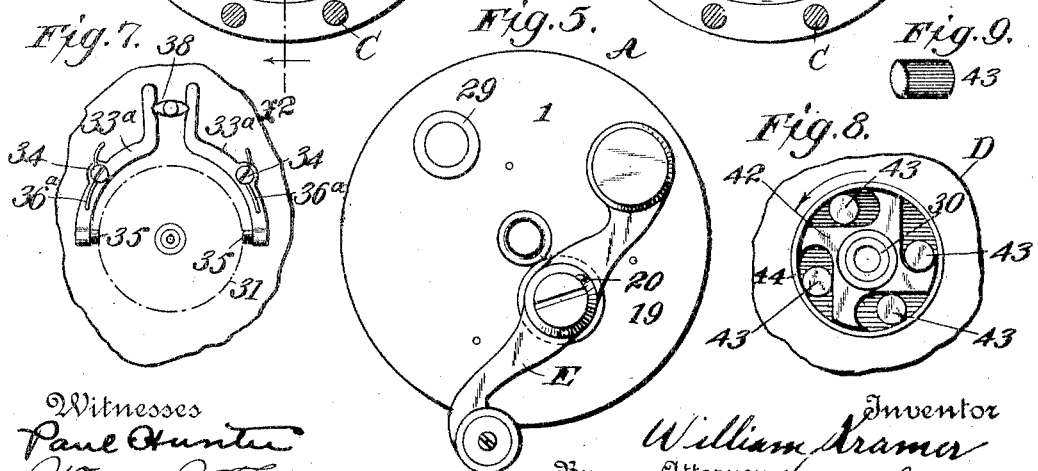
Witnesses
Paul Hunter
William J. Firth
Inventor
William Kramer
Attorney
Henry Connett No. 783,842. PATENTED FEB. 28, 1905.
W. KRAMER.
FISHING REEL.
APPLICATION FILED SEPT. 29, 1904.
2 SHEETS—SHEET 2.
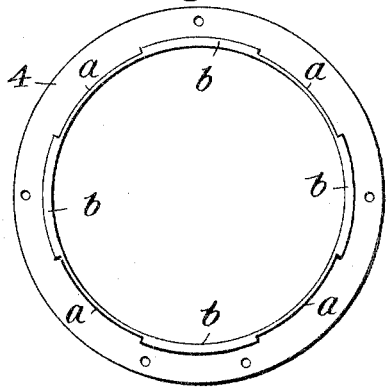
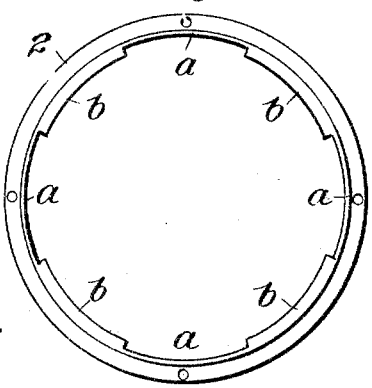
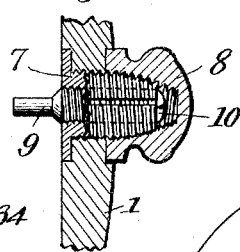
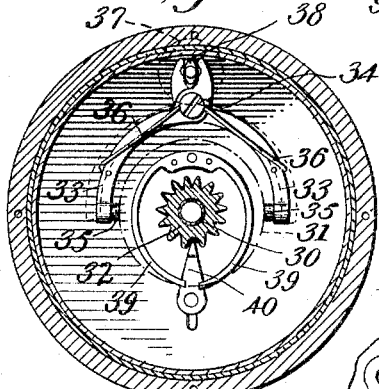
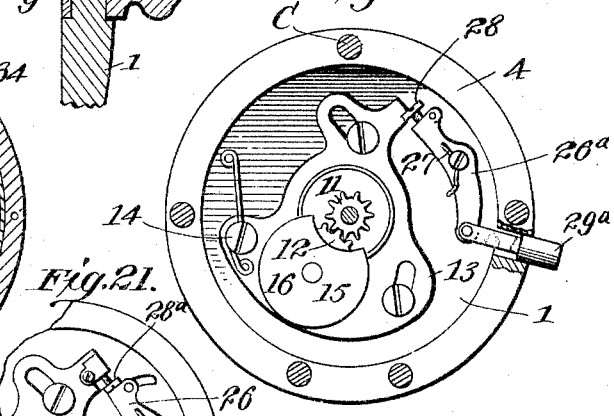
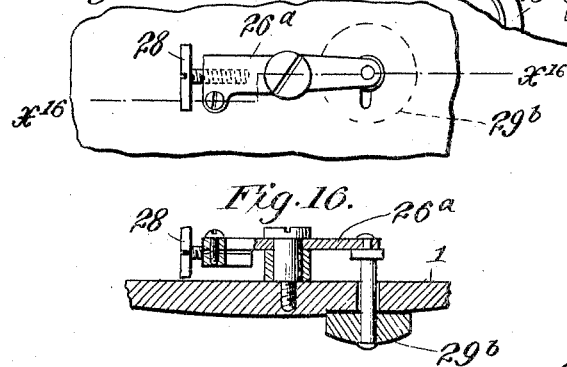
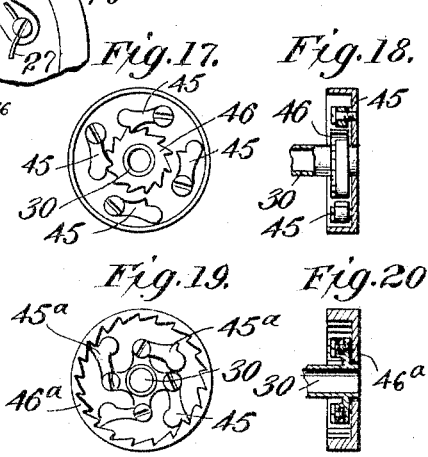
Witnesses
Paul Hunter
William J. Firth
Inventor
William Kramer
By his Attorney
Henry Connett No. 783,842.

Patented February 28, 1905.

UNITED STATES PATENT OFFICE.

WILLIAM KRAMER, OF NEW YORK, N. Y.

FISHING-REEL.

SPECIFICATION forming part of Letters Patent No. 783,842, dated February 28, 1905.

Application filed September 29, 1904. Serial No. 226,467.

*To all whom it may concern:*

Be it known that I, WILLIAM KRAMER, a citizen of the United States, residing in the borough of Brooklyn, in the county of Kings, in the city and State of New York, have invented certain new and useful Improvements in Fishing-Reels, of which the following is a specification.

This invention relates to reels used by anglers, and has for its object to improve the material of the reel to avoid warping and also injury to the angler's line and to improve the various features of construction of the reel, all as will be hereinafter more fully described. The novel features of the invention will be carefully defined in the claims.

In the accompanying drawings, which illustrate an embodiment of the invention, Figure 1 is a plan view of the reel. Fig. 2 is an axial section thereof, taken at broken line $x^2$ in Fig. 3. Fig. 3 is a transverse section taken at line $x^3$ in Fig. 2. Fig. 4 is a view similar to Fig. 3, but showing the multiplying and winding gears out of mesh or gear. Fig. 5 is an end view of the right-hand end or crank end of the reel. Fig. 6 shows the lock-nut of the crank in section and detached. Fig. 7 is a detached view of the drag. Figs. 8 and 9 illustrate the non-return clutch for the click and drag. Figs. 10 and 11 show the screw-rings with mutilated threads detached. Fig. 12 is an enlarged and detached view of the lock-nut for the bearing-studs of the spool-spindle. Fig. 13 is a transverse section showing the drag and click at the left in Fig. 2. Fig. 14 is a view similar to Fig. 13, illustrating a modified form of the releasing device for the gears. Figs. 15 and 16 are two views of a modification of the releasing device. Figs. 17 and 18 and 19 and 20 illustrate two modified forms of the non-return clutch device. Fig. 21 illustrates a further modification of the releasing device for the gears.

The reel has a frame consisting of two heads A and B, connected by tie-bars C, and a spool D rotatable in said frame. Rotation may be effected by a crank E, when the spool and crank are geared together. The reel has secured to the tie-bars a concave plate F for securing the reel to the angler's rod.

All of the above features have in some form been used in reels, and the present invention resides in the special material, appliances, and features of construction to be hereinafter described.

One feature of the construction is that the spool D and the major portion of the heads A and B are made from polished hard rubber. This obviated two important difficulties that have always existed in reels—namely, that when made of metal the dampness corrodes the parts and injures the line and when made from non-metallic materials the parts warp, shrink, and expand under the atmospheric influences to which they are subjected and seriously impair the free running of the spool. Hard rubber or vulcanite will not be influenced by the weather or atmospheric conditions and will not stain or injure the line used.

The peculiar construction of the heads will first be described. The head A at the right in Figs. 1 and 2 is in the nature of a hard-rubber disk 1, with a rim $1^a$, which forms a cup. In the inner face of this cup is fitted a flanged metal ring 2. (Seen detached in Fig. 11.) This ring is secured to the rubber by screws 3, and its flange is applied to the inner face of the rim $1^a$ and has a female screw-thread. The purpose of this ring 2 is to provide a metal screw-thread whereby the disk 1 is screwed onto one of two metal rings 4, Fig. 10, which latter are connected by the metal tie-bars C of the frame. The rings 4 have outwardly-turned flanges provided with male screw-threads to screw into the threads on the respective rings 2. The head B has substantially the same construction as that above described—that is to say, it consists of a hard-rubber disk 5, with a rim $5^a$, to which is secured a metal ring 2, as in the case with the other head, A.

By the term "flanged" as applied to the rings 2 and 4 is meant that they are L-shaped in cross-section, the attaching-flange of the ring having its face disposed substantially at right angles to the axis of the reel.

The hard-rubber spool D is secured on a metal spindle 6, which finds bearings in the heads, as will be described. At the head B there is screwed into the rubber disk 5 a split socket 7, Fig. 12, which is slightly tapered at its outer end and receives a nut 8. In Fig. 12 the taper is exaggerated somewhat for illustrative purposes. This socket-piece is internally screw-threaded, and into it is screwed the head of a bearing-stud 9 for that end of the spindle 6 which is socketed or bored to receive the stud 9. When the head of stud 9 is screwed into the socket until its end is flush with the outer end of the socket, a screw 10 is driven in its end and the nut 8 is screwed on to firmly clamp the split socket on the stud. A similar construction is employed at the head A and no separate description will be required for this.

On the end of the spindle 6 in the hollow of the head A is a pinion 11, adapted to gear at certain times with a spur-wheel 12, driven by the crank E. Referring especially to Figs. 3 and 4, on a shifting plate 13, pivoted at 14 and provided with a gear-casing 15, is fixed a bearing-stud 16. The wheel 12 has a sleeve-boss 17 and is mounted rotatively on said stud, the boss and stud extending out and receiving the crank. The stud has in its outer end a screw 18, and the sleeve has a square to receive the crank and a screw-thread to receive a nut 19, Fig. 6, which holds the crank in place. This nut has a broad base-flange through which is driven a set-screw 20, which holds the nut against turning.

The plate 13, which carries the crank and the spur-wheel 12, may swing about the point 14 in such a manner as to put said wheel and the pinion 11 into or out of gear at will, and a spring 21 tends to hold them out of gear by shifting the plate to the position seen in Fig. 4. The plate is guided by slots and screws, (seen at 22.) To permit of the movement of the sleeve-boss 17 laterally, there is an enlarged opening in the disk 1, and this is lined by a tubular metal bushing 23, Fig. 2, which extends out through a hard-rubber boss on the outer face of the said disk.

The device for releasing the plate 13 from the position seen in Fig. 3, where the gears are engaged, so as to permit the spring to shift the plate and disengage the gears, as in Fig. 4, will now be described.

In a projecting part of the plate 13 at the retaining-point is a notch or recess 24, and mounted pivotally at 25 on the disk 1 is an arm 26, which is normally pressed in toward the center of the disk by a spring 27. This arm carries at its free end an adjustable detent 28 in the nature of a screw the head of which is adapted to engage the recess 24 in the plate 13 or some part of the plate and hold the latter against shifting. This arm 26 is connected with the shank of a button 29 on the outer face of the disk 1, the said shank playing in a slot in the disk. Lateral movement of the button shifts the arm and frees the detent thereon from the recess in the plate.

The plate 13 is replaced by lateral pressure on the crank at the spindle.

Several slightly-modified forms of the releasing device are illustrated and will be described. In Fig. 14, for example, the arm $26^a$ is extended to form a lever, and a radially-disposed push-pin $29^a$ actuates it in lieu of the button 29. In Figs. 15 and 16, the latter being a section at line $x^{16}$ in Fig. 15, the lever $26^a$ is connected to the shank of a button $29^b$, which operates in the same manner as the button 29 of Figs. 3 and 4. Fig. 21 illustrates the same form of releasing device as that of Figs. 3 and 4, except that the adjustable feature is transferred from the arm to the plate. In this view the screw-detent $28^a$ is set in a block on the plate.

Within the hollow in the disk 5 of the head B are mounted the click and drag, which will now be described, together with the non-return clutch or pawl device connected therewith.

Referring especially to Figs. 2 and 13 as best showing the features, 30 is a sleeve which slips over the spindle 6, which latter may turn freely in the sleeve in one direction, but which compels the sleeve to rotate with it in the other direction by reason of a clutch or pawl device which will be hereinafter described. Secured on this sleeve are a drag-wheel 31 and a click-wheel 32, preferably connected together. As shown in Fig. 13, where the drag-wheel is indicated by a dotted circle, 33 33 are two like brake-levers pivoted together and to the disk 5 at 34 and provided at the free ends of their longer arms with brake-shoes 35, which bear on the respective opposite sides of the rim of the drag-wheel. A branched spring 36 tends to keep the shoes pressed up to the wheel. Between the shorter arms of the levers 33 is rotatively mounted in the disk the shank of a crank-button 37, Fig. 2, and on the inner end of this shank and between the shorter arms of said levers is secured a cross-head 38, which by turning the crank-button 37 spreads the shoes and removes their retarding pressure from the wheel. Fig. 7 shows a slightly-modified construction of the drag device, wherein the two brake-levers $33^a$ are fulcrumed separately, and the turning of the button so as to cause the cross-piece to spread the upper arms of the levers sets the shoes on the rim of the wheel. In this form the springs $36^a$ throw off the brake. The purpose of the drag is to prevent the spool when desired from rotating too freely in the direction to unwind the line.

The click device is clearly shown in Fig. 13. A ring-like spring 39, secured to the disk 5 at its middle, is cut opposite to the securing-point, and its extremities bear on the respective sides of a sliding click-pawl 40. This pawl is held yieldingly in a radial position with respect to the V-toothed click-wheel 32, and it is pivotally mounted on the shank of a button 41, the said shank being slidably mounted in a radially-disposed slot in the disk 5. When the click-pawl is moved into engagement with the teeth of the wheel 32, as seen in Fig. 13, the ends of the spring 39 engage recesses in the edges of the pawl and tend to hold it in that position; but a reasonably slight pressure on the button 41 will displace the spring ends and allow the pawl to be drawn back.

It will be noted that the spring 39 is cut from flat metal with a broad flat attaching part at its middle, as seen in Fig. 13. This form of spring will keep its place, while a spring made from wire will not.

As it is desired that the drag shall act only when the spool is rotated in one direction, the sleeve 30 is provided (see Fig. 8) with a head 42, which has four cam-recesses to receive as many rollers 43, one of which is seen detached in Fig. 8. This head 42 rotates in a circular recess in one end of the spool D, said recess having its wall formed of a metal ring 44. When the spool is turned in the direction of the arrow, (seen in Fig. 8,) it carries the sleeve with it; but when it rotates in the other direction it does so independently of the sleeve.

It is not desirable to use a spring-pawl and ratchet for this clutch device, as the clicking noise and wear is objectionable, and hence the brake shown in Figs. 8 and 9 is preferred; but the pawl device shown in Figs. 17 and 18 may be used. In this construction gravity-pawls 45, carried by the spool, may engage the teeth of a ratchet-wheel 46 on the sleeve 30. In this construction the rapid rotation of the spool when rotating in the inoperative direction will throw the pawls out of contact with the ratchet-teeth on the wheel.

The device as shown in Figs. 19 and 20 has the ratchet-teeth 46ᵃ on the spool and gravity-pawls 45ᵃ carried by the sleeve 30. This device will not make a loud clicking noise. In respect to these several clutch devices it may be explained that as the spool D is secured non-rotatively on the spindle 6 and they both rotate together and the sleeve 30 may rotate on the spindle the clutching of the sleeve to the spool is equivalent to clutching it to the spindle. In the operation of the three forms of clutches above described the result is the same. The sleeve 30 and spool D are made to rotate together by the action of the clutch device in each case.

In order to avoid the delay and difficulty found in screwing the ring 4, Fig. 10, into the ring 2, Fig. 11, it has been stated that the threads on these are mutilated. By this it is meant that one-half of the screw-threaded flange of each is cut away in sections, as seen at $a$ in Figs. 10 and 11, leaving intact sections $b$. When assembling the parts, the sections $b$ of the ring 4 are passed through the spaces $a$ in the ring 2, when a quarter-turn will secure the parts together closely and firmly.

In Fig. 2 will be seen a disk 47, of hard rubber by preference. This disk serves as a shield to prevent dust and sand from getting to the mechanism. To facilitate assembling the parts, this disk is not secured to the other parts except by slight friction about its edge sufficient to hold it in place. It occupies a position between the spool and the gearing and shields the latter; but in taking the reel apart it may be readily removed without distributing the mechanism, as no part of the latter is attached to it.

It may be explained here that the sleeve-boss 17, carrying the wheel 12, is embraced endwise between a cone at the base of the stud 16 and the coned head of the screw 18, the latter being utilized to take up wear.

Having thus described my invention, I claim—

1. A fishing-reel, having a frame, a spool in the frame, heads secured to the frame, a spindle mounted rotatively in the heads and carrying the spool, mechanism in the hollow of one of the heads and mounted thereon for driving the spool, and a disk interposed between said mechanism and the spool, said disk being wholly detached from the mechanism and readily detachable from the head.

2. A fishing-reel, having a spool with a rotating spindle, a pinion on said spindle, a spur-wheel to gear with and drive said pinion, a pivoted carrying-plate provided with a bearing-stud on which said spur-wheel rotates, a crank which rotates said spur-wheel, a spring which tends by its resiliency to move said plate and hold the wheel out of gear with the pinion, and means for holding said wheel and pinion in gear, said means comprising a pivoted, spring-actuated stop-lever adapted to engage said carrying-plate and hold the wheels in gear, an adjustable detent for regulating the depth of engagement of the teeth of the wheels, and means for moving said stop-lever to disengage it from the carrying-plate, so that the spring thereof may actuate it.

3. In a fishing-reel, the combination with the frame, composed of the flanged and screw-threaded metal rings 2 and the metal tie-bars secured to the flanges of said rings, of the heads, each consisting of a cup-shaped disk of non-metallic material with a rim, and a flanged and screw-threaded metal ring 4, applied to the inner face of said rim, the rings 2 and 4 screwing one into the other.

4. In a fishing-reel, the combination with the frame, composed of two screw-threaded metal rings, and tie-bars connecting the same, of the heads, each composed of a cup-shaped disk of non-metallic material having a rim, and a screw-threaded metal ring secured within said rim to receive the ring on the frame, the said rings screwing one into the other and the threads thereon being mutilated, substantially as and for the purpose set forth.

5. A fishing-reel, having a spool with a rotating spindle, a pinion on said spindle, a wheel 12 to gear with and drive said pinion, a pivoted carrying-plate 13, a stud thereon carrying said wheel 12, a spring which acts to shift said plate in a manner to hold the wheel out of gear with the pinion, hand-operated means for shifting the plate so as to put said wheel into gear with the pinion, a detent-arm 26, adapted to arrest the movement of the plate 13 and hold the wheel and pinion in gear, a spring 27 which tends to hold said arm in its detent position, adjustable means between the plate 13 and arm 26 which regulates the extent of engagement of the teeth of the wheel and pinion, and hand-operated means for displacing the detent-arm.

6. A fishing-reel, having a spool rotatively mounted, and provided with a spindle, a drag-wheel, a sleeve on the spindle of the spool and carrying said drag-wheel, clutching means between said sleeve and spool whereby the spool drives the sleeve when turning in one direction only, brake-levers, shoes thereon adapted to be set on and released from the drag-wheel, springs for said levers, a crank-button, and means carried thereby for rocking the brake-levers.

7. In a fishing-reel, the combination with the frame, of the spool, the spool-spindle mounted rotatively in the frame, the sleeve 30 on the said spindle, means for clutching said sleeve to the spool when the latter rotates in one direction only, the drag-wheel 31 secured on said sleeve, the pivoted brake-levers provided with shoes to bear on the drag-wheel, the springs of said levers, the crank-button 37 rotatively mounted and its shank disposed between arms of the respective brake-levers, and a cross-head 38 on said shank and adapted to spread apart said arms when the button is turned.

8. In a fishing-reel, the combination with the frame, the spool and the spool-spindle mounted rotatively in the frame, of a sleeve 30 on said spindle, means for coupling the sleeve and spool together operatively when the latter is rotating in one direction only, the drag-wheel secured on said sleeve, the two brake-levers 33, pivoted together at 34, the shoes on said levers, the springs tending to press said shoes on the drag-wheel, the crank-button 37, and the cross-head 38 on the shank of the button and disposed between the shorter arms of the brake-levers for spreading the latter and throwing off the brake.

9. A fishing-reel, having a spool rotatively mounted and provided with a spindle, a drag-wheel, means between the drag-wheel and the spool for driving it from the latter when the spool rotates in one direction only, a braking mechanism to be applied to the drag-wheel, and means for setting and releasing said mechanism.

In witness whereof I have hereunto signed my name, this 26th day of September, 1904, in the presence of two subscribing witnesses.

WILLIAM KRAMER.

Witnesses:
HENRY CONNETT,
BENJAMIN H. HOLT.